United States Patent
Beck et al.

(10) Patent No.: US 10,253,851 B2
(45) Date of Patent: Apr. 9, 2019

(54) AUTOMATIC PLANETARY TRANSMISSION

(71) Applicant: ZF Friedrichshafen AG, Friedrichshafen (DE)

(72) Inventors: Stefan Beck, Eriskirch (DE); Armin Gierling, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 90 days.

(21) Appl. No.: 15/699,150

(22) Filed: Sep. 8, 2017

(65) Prior Publication Data
US 2018/0073611 A1    Mar. 15, 2018

(30) Foreign Application Priority Data
Sep. 12, 2016    (DE) .................. 10 2016 217 327

(51) Int. Cl.
*F16H 3/66* (2006.01)
*B60K 6/365* (2007.10)
(Continued)

(52) U.S. Cl.
CPC ............. *F16H 3/663* (2013.01); *B60K 6/365* (2013.01); *B60K 6/387* (2013.01); *B60K 6/48* (2013.01);
(Continued)

(58) Field of Classification Search
CPC ............. B60K 6/365; F16H 2200/2012; F16H 2200/2046; F16H 2200/2023
See application file for complete search history.

(56) References Cited

U.S. PATENT DOCUMENTS

| | | | | |
|---|---|---|---|---|
| 2008/0182710 A1 * | 7/2008 | Shibata | ............... | B60K 6/40 477/3 |
| 2011/0045940 A1 * | 2/2011 | Gumpoltsberger | ....... | F16H 3/66 475/275 |

(Continued)

FOREIGN PATENT DOCUMENTS

| | | | | |
|---|---|---|---|---|
| DE | 102008041887 A1 * | 3/2010 | ............... | B60K 6/26 |
| DE | 202015004910 U1 | 8/2015 | | |
| WO | WO 2015080020 A1 | 6/2015 | | |

OTHER PUBLICATIONS

German Search Report DE102016217327.8, dated Apr. 4, 2017. (10 pages).

*Primary Examiner* — Jacob S. Scott
*Assistant Examiner* — Murad Jahmani
(74) *Attorney, Agent, or Firm* — Dority & Manning, P.A.

(57) ABSTRACT

An automatic transmission includes first shaft, second shaft, four planetary gear sets, and six shift elements for forming different gear ratios between the first and second shafts. The first, third and fourth planetary gear sets are negative planetary gear sets and the second planetary gear set is a positive planetary gear set. The planetary gear carriers of the first, second, and fourth planetary gear sets are connected and form the first shaft. The planetary gear carrier of the third planetary gear set forms the second shaft. First shift element is between a third shaft and the housing; second shift element is between a fourth shaft and the housing; third shift element is between second and eighth rotatable shafts; fourth shift element is between fourth and sixth rotatable shafts; fifth shift element is between fifth and seventh rotatable shafts; and sixth shift element is between sixth and the seventh rotatable shafts.

12 Claims, 7 Drawing Sheets

(51) Int. Cl.
  *B60K 6/387* (2007.10)
  *B60K 6/48* (2007.10)
  *B60K 6/547* (2007.10)
  *F16D 25/10* (2006.01)
  *F16H 37/08* (2006.01)
  *B60K 6/38* (2007.10)

(52) U.S. Cl.
  CPC ........ *B60K 6/547* (2013.01); *B60K 2006/381* (2013.01); *B60K 2006/4825* (2013.01); *F16D 25/10* (2013.01); *F16H 37/0813* (2013.01); *F16H 2200/0069* (2013.01); *F16H 2200/0073* (2013.01); *F16H 2200/201* (2013.01); *F16H 2200/2012* (2013.01); *F16H 2200/2023* (2013.01); *F16H 2200/2046* (2013.01); *F16H 2200/2048* (2013.01); *F16H 2200/2064* (2013.01); *F16H 2200/2094* (2013.01); *Y02T 10/6221* (2013.01); *Y02T 10/6252* (2013.01)

(56) References Cited

U.S. PATENT DOCUMENTS

| | | | |
|---|---|---|---|
| 2013/0267366 A1* | 10/2013 | Mellet | B60K 6/547 475/5 |
| 2015/0031493 A1* | 1/2015 | Beck | F16H 3/666 475/275 |
| 2015/0323067 A1* | 11/2015 | Ziemer | F16H 61/0403 475/149 |
| 2016/0160964 A1* | 6/2016 | Sugiura | F16D 25/0638 475/204 |

* cited by examiner

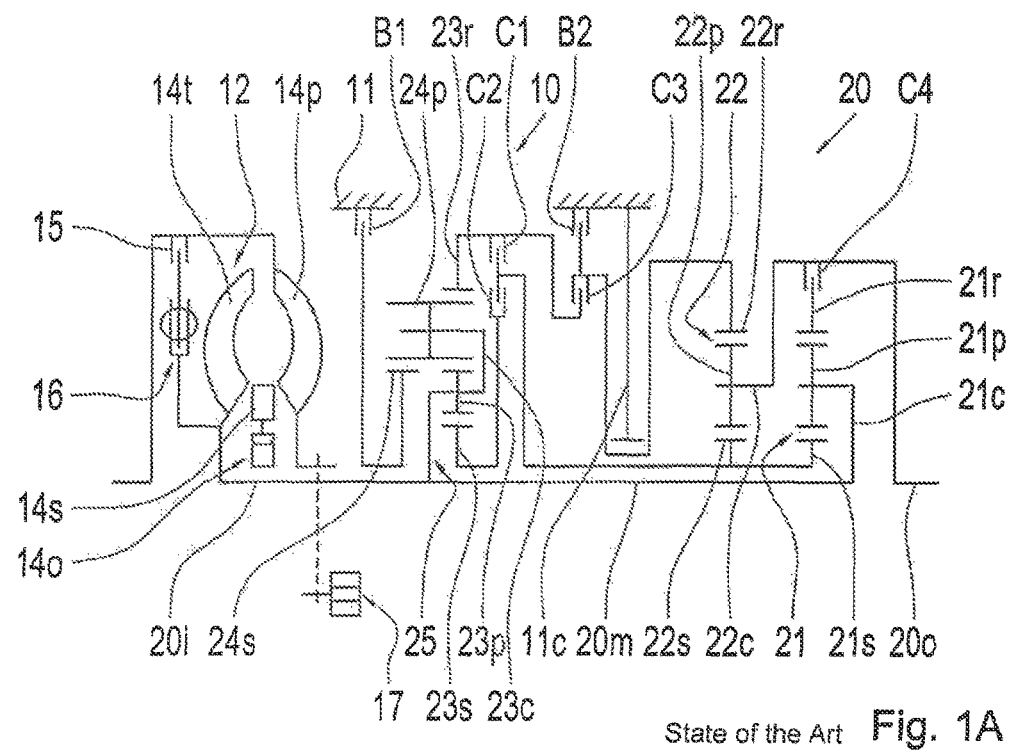
State of the Art  Fig. 1A
|  | C1 | C2 | C3 | C4 | B1 | B2 |
|---|---|---|---|---|---|---|
| 1st | o | o | - | - | - | o |
| 2nd | o | - | - | - | o | o |
| 3rd | - | o | - | - | o | o |
| 4th | - | - | - | o | o | o |
| 5th | - | o | - | o | o | - |
| 6th | o | - | - | o | o | - |
| 7th | o | - | o | o | - | - |
| 8th | - | - | o | o | o | - |
| 9th | o | - | o | - | o | - |
| 10th | - | o | o | - | o | - |
| REV. | - | o | o | - | - | o |
State of the Art  Fig. 1B

| gear | engaged shifting elements | | | | | | |
|---|---|---|---|---|---|---|---|
| | brakes | | clutches | | | | |
| | 03 | 04 | 28 | 46 | 47 | 57 | 67 |
| 1 |  | X |  |  |  | X | X |
| 2 | X | X |  |  |  |  | X |
| 3 | X | X |  |  |  | X |  |
| 4 | X | X | X |  |  |  |  |
| 5 | X |  | X |  |  | X |  |
| 6 | X |  | X |  |  |  | X |
| 7 |  |  | X | X |  |  | X |
| 8 | X |  | X | X |  |  |  |
| 9 | X |  |  | X |  |  | X |
| 10 | X |  |  | X |  | X |  |
| 11 | X |  |  |  | X | X |  |
| R |  | X |  | X |  | X |  |

| gear | engaged shifting elements | | | | | | |
|---|---|---|---|---|---|---|---|
| | brakes | | clutches | | | | |
| | 03 | 04 | 28 | 46 | 27 | 57 | 67 |
| 1 |  | X |  |  |  | X | X |
| 2 | X | X |  |  |  |  | X |
| 3 | X | X |  |  |  | X |  |
| 4 | X | X | X |  |  |  |  |
| 5 | X |  | X |  |  | X |  |
| 6 | X |  | X |  |  |  | X |
| 7 |  |  | X | X |  |  | X |
| 8 | X |  | X | X |  |  |  |
| 9 | X |  |  | X |  |  | X |
| 10 | X |  |  | X |  | X |  |
| 11 | X |  |  |  | X | X |  |
| R |  | X |  | X |  | X |  |

| gear | engaged shifting elements | | | | | | |
|---|---|---|---|---|---|---|---|
| | brakes | | clutches | | | | |
| | 03 | 04 | 28 | 46 | 24 | 57 | 67 |
| 1 | | X | | | | X | X |
| 2 | X | X | | | | | X |
| 3 | X | X | | | | X | |
| 4 | X | X | X | | | | |
| 5 | X | | X | | | X | |
| 6 | X | | X | | | | X |
| 7 | | | X | X | | | X |
| 8 | X | | X | X | | | |
| 9 | X | | | X | | | X |
| 10 | X | | | X | | X | |
| 11 | X | | | | X | X | |
| R | | X | | X | | X | |

AUTOMATIC PLANETARY TRANSMISSION

BACKGROUND

The present invention relates generally to an automatic transmission in planetary design.

Automatically shiftable vehicle transmissions in planetary design have been described many times in the state of the art and are undergoing continuous further development and improvement. The objective is for these transmissions to exhibit an adequate number of gears and a gear ratio appropriate for motor vehicles, with a high overall transmission ratio spread, favorable gear steps and a starting torque ratio that is sufficiently high for the specific application. At the same time, the construction expenditure of these transmissions should be as low as possible; in particular only a small number of shift elements should be required. In addition, in sequential shifting mode so-called grouped shifting is generally to be avoided; i.e. when shifting into the next higher or the next lower gear, in each case only one previously engaged shift element is disengaged and one previously disengaged shift element is engaged.

A generic automatic transmission with a transmission housing, an input shaft, an output shaft, four planetary gear sets, two hydraulically actuatable brakes and four hydraulically actuatable clutches, in which three of these six shift elements are engaged in every gear to create one reverse gear and ten forward gears without grouped shifting, is known from WO 2015/080020 A1. The first two of the four planetary gear sets form an upstream gear set, which is configured as a reduced two connections-four shafts transmission in the design of a Ravigneaux planetary gear set and is permanently connected to the input shaft. The other two of the four planetary gear sets form a main gear set, which is configured as a two connections-five shafts transmission similar to a Simpson planetary gear set and is permanently connected to the input shaft and permanently connected to the output shaft. Following the nomenclature used in WO 2015/080020 A1, the first brake is permanently connected only to the upstream gear set, while the second brake and the fourth clutch are permanently connected only to the main gear set. The first, second and third clutch, on the other hand, are permanently connected to both the main gear set and the upstream gear set, such that the first, second and third clutch are disposed in the power flow between the upstream gear set and main gear set. This allows three different output speeds of the upstream gear set, of which one is lower than the input shaft speed, one is equal to the input shaft speed and one is higher than the input shaft speed, to selectively be transmitted to the main gear set. FIG. 1A shows the transmission diagram of this generic automatic transmission; FIG. 1B shows the associated shift logic.

The upstream gear set of WO 2015/080020 A1 includes one positive or plus planetary gear set and one negative or minus planetary gear set, which are coupled to one another, as a whole including a first and a second sun gear, only one planetary gear carrier and only one ring gear, of which, following the nomenclature of WO 2015/080020 A1, the first sun gear is allocated to the plus planetary gear set and the second sun gear is allocated to the minus planetary set, while the planetary gear carrier and the ring gear are allocated to both planetary gear sets of the upstream gear set. The inner and outer planetary gears of the plus planetary gear set, of which the outer planetary gears at the same time form the planetary gears of the minus planetary gear set, are rotatably mounted on this common planetary gear carrier. Correspondingly, each of the inner planetary gears is in tooth engagement with the first sun gear and with one of the outer planetary gears, while each of the outer planetary gears is in tooth engagement with the second sun gear, with the common ring gear and with one of the inner planetary gears. The second sun gear of the upstream gear set forms the first shaft of the upstream gear set and is permanently connected to the first brake, so that the first shaft of the upstream gear set is fixable on the transmission housing. The planetary gear carrier of the upstream gear set forms the second shaft of the upstream gear set and is permanently connected to the input shaft. The ring gear of the upstream gear set forms the third shaft of the upstream gear set, and is permanently connected to the first clutch and the third clutch in such a way that the third shaft of the upstream gear set is connectable with two different elements of the main gear set. The first sun gear of the upstream gear set forms the fourth shaft of the upstream gear set, and is permanently connected to the second clutch in such a way that the fourth shaft is connectable to the main gear set as well.

The main gear set of US 2016/0160964 A1 includes two individual negative or minus planetary gear sets that are coupled to one another and that each include a sun gear, a ring gear and a planetary gear carrier, on which planetary gears that are in mesh with said sun gear and said ring gear are rotatably mounted. The two sun gears of the main gear set are permanently connected to one another, form the first shaft of the main gear set, and are permanently connected to both the first clutch and the second clutch in such a way that the first shaft of the main gear set can optionally be connected to either the third or the fourth shaft of the upstream gear set. The planetary gear carrier of the second planetary gear set in the main gear set forms the second shaft of the main gear set, and is permanently connected to the output shaft and to the fourth clutch. The ring gear of the second planetary gear set in the main gear set forms the third shaft of the main gear set, and is permanently connected to the second brake and the third clutch in such a way that the third shaft of the main gear set can optionally be fixed on the transmission housing or connected to the third shaft of the upstream gear set. The planetary gear carrier of the first planetary gear set in the main gear set forms the fourth shaft of the main gear set, and is permanently connected to the input shaft. The ring gear of the first planetary gear set in the main gear set forms the fifth shaft of the main gear set, and is permanently connected to the fourth clutch in such a way that the fifth shaft of the main gear set is connectable to the second shaft of the upstream gear set by engaging the fourth clutch.

SUMMARY OF THE INVENTION

As such, exemplary aspects of the present invention further develop the automatic transmission known from WO 2015/080020 A1 with respect to the number of gears.

An automatic transmission is provided, particularly for a motor vehicle, which includes a transmission housing, a drivable first rotatable shaft, a second rotatable shaft forming an output of the automatic transmission, four planetary gear sets and seven shift elements according to the invention for shifting into different gear ratios between the first shaft and the second shaft. The first rotatable shaft is also referred to as the transmission input shaft; the second rotatable shaft is also referred to as the transmission output shaft or the transmission outlet shaft. The first rotatable shaft is drivable by an internal combustion engine and/or an electric motor, for example. The first, third and fourth planetary gear sets are respectively negative or minus planetary gear sets, while the second planetary gear set is a positive or plus planetary gear set.

With respect to the connections between the individual elements of the planetary gear sets and for the formation of the individual shafts of the automatic transmission, the following is provided: A planetary gear carrier of the first planetary gear set, a planetary gear carrier of the second planetary gear set and a planetary gear carrier of the fourth planetary gear set are permanently connected to one another and form the first rotatable shaft of the automatic transmission. A planetary gear carrier of the third planetary gear set forms the second rotatable shaft of the automatic transmission. A sun gear of the first planetary gear set forms a third rotatable shaft of the automatic transmission. A ring gear of the third planetary gear set forms the fourth rotatable shaft of the automatic transmission. A sun gear of the second planetary gear set forms the fifth rotatable shaft of the automatic transmission. A ring gear of the first planetary gear set and a ring gear of the second planetary gear set are permanently connected to one another or configured as a common component and form a sixth rotatable shaft of the automatic transmission. A sun gear of the third planetary gear set and a sun gear of the fourth planetary gear set are permanently connected to one another and form the seventh rotatable shaft of the automatic transmission. A ring gear of the fourth planetary gear set forms the eighth rotatable shaft of the automatic transmission.

With respect to the connection of the seven shift elements to the individual rotatable shafts of the automatic transmission, the following is provided: The first shift element is disposed in the power flow between the third rotatable shaft and the transmission housing, so that the sun gear of the first planetary gear set is fixable on the transmission housing by engaging the first shift element. The second shift element is disposed in the power flow between the fourth rotatable shaft and the transmission housing, so that the ring gear of the third planetary gear set is fixable on the transmission housing by engaging the second shift element. The third shift element is disposed in the power flow between the second rotatable shaft and the eighth rotatable shaft, so that the ring gear of the fourth planetary gear set is connectable to the planetary gear carrier of the third planetary gear set and the output of the automatic transmission by engaging the third shift element. The fourth shift element is disposed in the power flow between the fourth rotatable shaft and the sixth rotatable shaft, so that, by engaging the fourth shift element, the ring gear of the third planetary gear set is connectable to the ring gear of the first planetary gear set that is permanently connected to the ring gear of the second planetary gear set, or forms a common component with the ring gear of the second planetary gear set. The fifth shift element is disposed in the power flow between the fifth rotatable shaft and the seventh rotatable shaft, so that the sun gears of the third and the fourth planetary gear set, which are permanently connected to one another, are connectable to the sun gear of the second planetary gear set by engaging the fifth shift element. The sixth shift element is disposed in the power flow between the sixth rotatable shaft and the seventh rotatable shaft, so that, by engaging the sixth shift element, the sun gears of the third and the fourth planetary gear set, which are permanently connected to one another, are connectable to the ring gear of the first planetary gear set, that is permanently connected to the ring gear of the second planetary gear set, or forms a common component with the ring gear of the second planetary gear set.

According to the invention, the seventh shift element, which is additional compared to the generic WO 2015/080020 A1, is disposed in the power flow either between the fourth and the seventh rotatable shaft, between the second and the seventh rotatable shaft or between the second and the fourth rotatable shaft, so that the third planetary gear set can be interlocked by engaging the seventh shift element, a state in which the sun gear, the planetary gear carrier and the ring gear of the third planetary gear set rotate at the same speed.

Each of the four planetary gear sets thus includes a first, second and a third element, whereby individual elements may also be combined. As in the generic WO 2015/080020 A1, the first and the second planetary gear set form an upstream gear set that is connected to the first rotatable shaft, i.e. drivable, while the third and the fourth planetary gear set form a main gear set that is permanently connected to both the first rotatable shaft, i.e. drivable, and to the second rotatable shaft, i.e. the output of the automatic transmission. The seventh shift element, which is additional compared to the generic WO 2015/080020 A1, enables an additional forward gear by situative interlocking of the third planetary gear set. This will be explained in more detail later.

Within the context of coupling a shift element to a planetary gear set, the wording "permanently connected" is understood to mean that the input or output element of the respective shift element is directly connected to one of the elements of the respective planetary gear set by a torque-proof or torsionally flexible connection, so that there is always a constant speed correlation between said planetary gear set element and the input or output element of said shift element.

Within the context of coupling a shift element to a shaft, the wording "permanently connected" is understood to mean that the input or output element of the respective shift element is directly connected to the respective shaft by a torque-proof or torsionally flexible connection, so that there is always a constant speed correlation between said shaft and the input or output element of said shift element.

Within the context of coupling a planetary gear set to another planetary gear set, the wording "permanently connected" is understood to mean that one of the elements of the respective planetary gear set is directly connected to one of the elements of the respective other planetary gear set by a torque-proof or torsionally flexible connection, so that there is always a constant speed correlation between the two planetary gear set elements.

Within the context of coupling a planetary gear set element or a shift element to the housing, the wording "permanently connected" is understood to mean that the respective planetary gear set element or the output element of the respective shift element is directly connected to the housing by a torque-proof or torsionally flexible connection, so that the respective planetary gear set element or the output element of the respective shift element is always stationary.

As is generally known, the "elements of a planetary gear set" are the sun gear, the planetary gear carrier and the ring gear of said planetary gear set.

With respect to the structural configuration of the four named planet systems, as already mentioned, it is provided that the first, third and fourth planetary gear set are respectively a negative or minus planetary gear set, while the second planetary gear set is a positive or plus planetary gear set. As is known, a negative or minus planetary gear set includes a planetary gear carrier with planetary gears rotatably mounted thereon, all of which mesh or are in tooth engagement with the sun gear and the ring gear of said minus planetary gear set. A positive or plus planetary gear set, on the other hand, includes a planetary gear carrier with inner and outer planetary gears rotatably mounted thereon, in which each of its inner planetary gears respectively meshes or is in tooth engagement with one of its outer planetary gear and with the sun gear of said plus planetary gear set, while each of its outer planetary gear respectively meshes or is in tooth engagement with one of its inner planetary gear and with the ring gear of said plus planetary gear set.

As in case of the generic WO 2015/080020 A1, the first and the second planetary gear set in the present case form an upstream gear set, which is a two-carrier four-shaft planetary transmission, is permanently connected to the first rotatable shaft or the transmission input shaft and is designed in the manner of a so-called Ravigneaux planetary gear set. As in case of the generic WO 2015/080020 A1, the third and the fourth planetary gear set form a main gear set, a two-carrier five-shaft planetary transmission, which is permanently connected to the first rotatable shaft (transmission input shaft) and to the second rotatable shaft (transmission output shaft), and is similar to a Simpson planetary gear set. In contrast to the generic WO 2015/080020 A1, the third planetary gear set can be interlocked as well.

In contrast to the generic state of the art, the automatic transmission according to the invention includes independent kinematics, with which, by using the seven shift elements, it is now possible to shift into eleven forward gears and one reverse gear.

In the automatic transmission according to the invention, it is preferred that three of the seven shifting elements are engaged in each gear. When shifting from one gear to the next higher or lower gear, in each case only one of the previously engaged shift elements is disengaged and one previously disengaged shift element is engaged, so that, for sequential up or downshifting by one respective gear, so-called grouped shifting is avoided.

In order to represent eleven forward gears and one reverse gear with seven shifting elements, the following shift logic or gear logic can be provided: In the first forward gear, the second, fifth and sixth shift elements are torque transmitting. In the second forward gear, the first, second and sixth shift elements are torque transmitting. In the third forward gear, the first, second, and fifth shift elements are torque transmitting. In the fourth forward gear, the first, second, and third shift elements are torque transmitting. In the fifth forward gear, the first, third, and fifth shift elements are torque transmitting. In the sixth forward gear, the first, third, and sixth shift elements are torque transmitting. In the seventh forward gear, the third, fourth and sixth shift elements are torque transmitting. In the eighth forward gear, the first, third, and fourth shift elements are torque transmitting. In the ninth forward gear, the first, fourth and sixth shift elements are torque transmitting. In the tenth forward gear, the first, fourth and fifth shift elements are torque transmitting. In the eleventh forward gear, the first, fifth and seventh shift elements are torque transmitting. In the reverse gear, the second, fourth and fifth shift elements are torque transmitting.

The compared to the generic WO 2015/080020 A1 additional forward gear thus provides an additional overdrive ratio that is smaller than the previously smallest overdrive ratio; thereby enabling a further comfort-enhancing rotational speed reduction at the engine driving the automatic transmission. If this engine is an internal combustion engine, this additional speed reduction can also lead to further improved fuel economy.

As long as the inventive kinematics of the coupling of the four planetary gear sets amongst one another, to the seven shift elements, to the first rotatable shaft or transmission input shaft and to the second rotatable shaft or transmission output shaft is maintained, the spatial arrangement of the planetary gear sets and shift elements within the transmission housing is widely variable.

In one embodiment therefore, for the spatial arrangement of the four planetary gear sets in the transmission housing, it is proposed that all four planetary gear sets be arranged coaxially adjacent to one another in the defined sequence "first, second, third, fourth planetary gear set", which allows all clutches and brakes to be supplied with the pressurizing medium required for hydraulic actuation in a comparatively simple manner. For an application with coaxially aligned transmission input and transmission output shafts, it is useful in this case for the first planetary gear set to be the planetary gear set of the planetary gear set group that faces the drive of the automatic transmission. Of course, other spatial arrangements of the four planetary gear sets in the transmission housing of the automatic transmission are possible as well.

In one embodiment for the spatial arrangement of the shift elements in the transmission housing, it is proposed that the inventive additional seventh shift element be disposed in an area axially between the second and the third planetary gear set, preferably adjacent to the third planetary gear set. If the seventh shift element is permanently connected to the planetary gear carrier of the third planetary gear set, it can also be useful, in spatial terms, to dispose the seventh shift element in an area axially between the third and the fourth planetary gear set, again preferably axially adjacent to the third planetary gear set.

In a further embodiment for the spatial arrangement of the shift elements in the transmission housing, it is proposed that the fourth, fifth and sixth shift element form a clutch assembly, which can be pre-assembled in a manner advantageous in terms of production engineering, is axially adjacent to the second planetary gear set and includes a first disc carrier that is an external disc carrier for the fifth shift element and an inner disc carrier for the sixth shift element, a second disc carrier that is an external disc carrier for the sixth shift element and an inner disc carrier for the fourth shift element, a disc pack with the inner and outer clutch discs of the fifth shift element, an actuation device of the fifth shift element that acts on the disc pack of the fifth shift element, a disc pack with the inner and outer clutch discs of the sixth shift element an actuation device of the sixth shift element that acts on the disc pack of the sixth shift element, a disc pack with the inner and outer clutch discs of the fourth shift element and an actuation device of the fourth shift element that acts on the disc pack of the fourth shift element. Viewed in axial direction, the disc pack of the fourth shift element is disposed substantially radially above the disc pack of the sixth shift element, while, viewed in axial direction, the disc pack of the sixth shift element is disposed substantially radially above the disc pack of the fifth shift element.

The shift elements can be powershifting clutches or brakes. In particular force-locking clutches or brakes, such as e.g. multi-disc clutches, band brakes and/or cone clutches, are usable. For the shift elements, however, positive-locking brakes and/or clutches, such as e.g. synchronizations or dog clutches, are usable as well. In particular the inventive additional seventh shift element is well-suited for design as a dog clutch, because it is needed only to engage the highest forward gear; i.e. it only has to shift a low differential speed.

All proposed designs and embodiments of an automatic transmission according to the invention, in particular for passenger cars, exhibit practicable gear ratios with a very high overall transmission ratio spread in gear spacing that is favorable in terms of driveability, which has a positive effect on the desired low fuel consumption. The automatic transmission according to the invention is further characterized by a low number of shift elements in relation to the number of gears and a comparatively low construction expenditure. The automatic transmission according to the invention is also characterized by good efficiency, among other things as a result of the comparatively low drag losses at the shift elements.

With the automatic transmission according to the invention, it is advantageously possible to realize launching the motor vehicle both with a transmission-external launching element and with a transmission-internal frictional shift element. In a known manner, a transmission-external launching element can be, for example, a hydrodynamic torque converter (preferably with a converter lock-up clutch), a dry launching clutch, a wet launching clutch, a magnet particle clutch, or a centrifugal clutch. Alternative to the arrangement of such a launching element in power flow direction between the drive motor and the automatic transmission, the transmission-external launching element in power flow direction can also be disposed, viewed in power flow direction, behind the automatic transmission whereby in this case the transmission input shaft of the automatic transmission is permanently connected to a crankshaft of the drive motor in a torsion-resistant or torsionally elastic manner. The second shift element, which is a brake torque transmitting in the first four forward gears and in the reverse gear, is particularly a transmission-internal launching element.

The automatic transmission according to the invention is furthermore designed to allow adaptability to a variety of drive train configurations, both with respect to power flow direction and in spatial terms. Depending on the stationary transmission ratio of the individual planetary gear sets, different ratio spacings can thus result from the same transmission diagram, so that application or vehicle-specific modification is made possible. Without special structural measures, it is furthermore possible to optionally arrange the drive and output of the automatic transmission coaxially or axis-parallel to one another. An axle differential and/or a transfer differential can be disposed on the input side or on the output side of the automatic transmission. It is also possible to provide additional freewheels at any suitable location of the automatic transmission, for example between a rotatable shaft and the transmission housing, or to optionally connect two rotatable shafts. It is also possible to dispose a wear-free brake, such as e.g. a hydraulic or electric retarder or the like, on each rotatable shaft, preferably on the transmission input shaft or on the transmission output shaft. This is particularly important for use in commercial vehicles. To power additional units, an auxiliary output can also be provided on each rotatable shaft, preferably on the transmission input shaft or on the transmission output shaft.

Another advantage of the automatic transmission according to the invention is that an electric motor is additionally mountable on many rotatable shafts as a generator and/or as an additional drive motor. It is generally possible to couple such an electric motor directly to the first and/or the second rotatable shaft of the automatic transmission in a structurally very simple manner. The proposed gear set concept also allows such an electric motor to be coupled directly to the fourth and/or the sixth rotatable shaft in a structurally very simple manner, however. If such an electric motor is coupled directly to the fourth or the sixth rotatable shaft, said electric motor can advantageously also take over the function of electrodynamic gear shifting, in which the electric motor EM takes over the respective power shifting, i.e. produces or supports the supporting torque occurring in the respective shifting progression.

BRIEF DESCRIPTION OF THE DRAWINGS

Using the drawings as examples, the exemplary embodiments of the present invention will be explained in more detail in the following. Identical or comparable components are also provided with the same reference numerals. The following is shown:

FIG. 1A shows a schematic illustration of an automatic transmission in accordance with the state of the art;

FIG. 1B shows an engagement sequence diagram for the automatic transmission according to FIG. 1A;

DETAILED DESCRIPTION

FIGS. 1A and 1B show the transmission diagram and the shift logic for the automatic transmission with ten forward gears and one reverse gear known from the state of the art of WO 2015/080020 A1, as already described in detail at the beginning of the patent application.

A variety of design examples for an automatic transmission according to the invention will be described in more detail in the following with the aid of FIGS. 2A, 2B, 2C, 3A, 3B, 3C, 4A, 4B, and 4C.

Figure 2A:
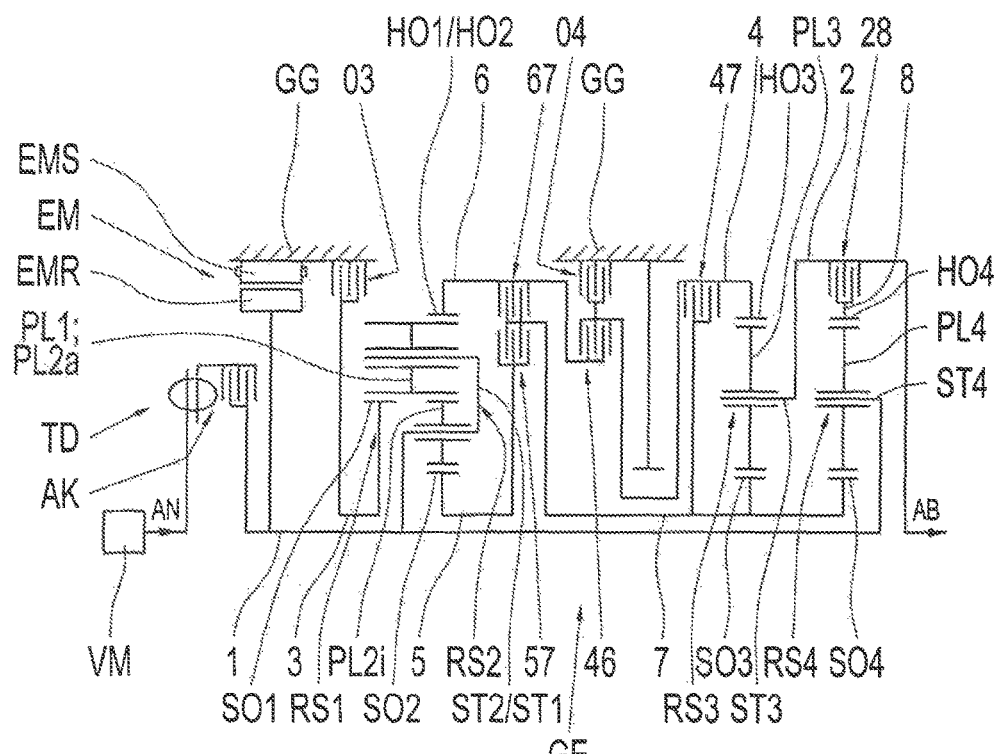
FIG. 2A shows a schematic illustration of a first design example of an automatic transmission according to the invention.

FIG. 2A shows the transmission diagram of a first design example of an automatic transmission according to the invention in an exemplary drive train, in particular of a motor vehicle. The transmission is an automatic transmission is labeled as GE and includes eight rotatable shafts 1, 2, 3, 4, 5, 6, 7, 8, four planetary gear sets RS1, RS2, RS3, RS4 and seven shift elements 03, 04, 28, 46, 57, 67, 47, which are all disposed in a transmission housing GG of the transmission GE. The first rotatable shaft 1 is drivable and thus forms the transmission input shaft, while the second rotatable shaft 2 forms an output AB of the transmission GE.

The transmission GE is drivable by an internal combustion engine VM, which is shown in the figures in a very simplified manner, the speed and torque of the internal combustion engine VM is transmitted to the input side clutch-half of a launching clutch AK via an input shaft AN with interposition of a torsion damper TD. The output side clutch-half of this launching clutch AK is connected to the first rotatable shaft 1 of the transmission GE, so that the launching clutch AK has to be properly engaged to transfer the drive power of the internal combustion engine VM to the transmission GE. As an alternative to the launching clutch AK, it is also possible to provide other launching elements disposed in the power flow between the internal combustion engine VM and the first rotatable shaft 1 of the transmission GE; for example a torque converter, preferably with a converter lock-up clutch.

The design example shown in FIG. 2A additionally includes an electric drive. An electric motor EM is provided for this purpose, the rotor EMR of the electric motor EM is connected to the first rotatable shaft 1 of the transmission GE and the stator EMS of the electric motor EM is mounted on the transmission housing GG.

The four planetary gear sets RS1 to RS4 of the transmission GE are disposed, in spatial terms, as an example, axially behind one another in the exemplary sequence "RS1-RS2-RS3-RS4", whereby the first planetary gear set RS1 is disposed on the input side of the transmission GE and the fourth planetary gear set RS4 is disposed on the output side of the transmission GE. In another configuration of the transmission, while maintaining the kinematics, the four planetary gear sets can be disposed in a modified sequence, which is particularly useful when the transmission input and the transmission output shaft in the transmission should not be disposed coaxially to one another.

The first and second planetary gear sets RS1, RS2 kinematically form an upstream gear set that is permanently connected to the first rotatable shaft 1 and is a "reduced two-carrier four-shaft planetary transmission" in the design of the known Ravigneaux planetary gear set, including two sun gears SO1 and SO2, a coupled planetary gear carrier ST1/ST2 and a common ring gear HO1/HO2. The first planetary gear set RS1 is a negative or minus planetary gear set, while the second planetary gear set RS2 is a positive or plus planetary gear set. Correspondingly, planetary gears PL1 are rotatably mounted on the planetary gear carrier ST1 allocated to the first planetary gear set RS1, and all mesh with the sun gear SO1 and the common ring gear HO1/HO2 allocated to the first planetary gear set RS1. On the planetary gear carrier ST2 allocated to the second planetary gear set RS2, on the other hand, inner planetary gears PL2$i$ and outer planetary gears PL2$a$ are rotatably mounted, whereby each of the said inner planetary gears PL2$i$ meshes with one of the said outer planetary gears PL2$a$ and with the sun gear SO2 allocated to the second planetary gear set RS2 and each of the said outer planetary gears PL2$a$ meshes with one of the said inner planetary gears PL2$i$ and the common ring gear HO1/HO2. In doing so, the outer planetary gears PL2$a$ of the second planetary gear set simultaneously form the planetary gears PL1 of the first planetary gear set RS1. The sun gear SO1 of the first planetary gear set RS1 forms the third rotatable shaft 3 of the transmission GE. The sun gear SO2 of the second planetary gear set RS2 forms the fifth rotatable shaft 5 of the transmission GE. The common ring gear HO1/HO2 of the upstream gear set forms the sixth rotatable shaft 6 of the transmission GE.

The third and the fourth planetary gear sets RS3, RS4 kinematically form a main gear set, which is permanently connected to the first rotatable shaft 1 and to the second rotatable shaft 2 and is a two-carrier five-shaft planetary transmission similar to the known Simpson planetary gear set, including two sun gears SO3 and SO4, two planetary gear carriers ST3 and ST4 and two ring gears HO3 and HO4. The third and fourth planetary gear sets RS3, RS4 are each a simple minus planetary gear set, respectively including three elements. The sun gear SO3 forms the first element of the third planetary gear set RS3, the sun gear SO4 forms the first element of the fourth planetary gear set RS4, the planetary gear carrier ST3 forms the second element of the third planetary gear set RS3, the planetary gear carrier ST4 forms the second element of the fourth planetary gear set RS4, the ring gear HO3 forms the third element of the third planetary gear set RS3, the ring gear HO4 forms the third element of the fourth planetary gear set RS4. In accordance with the configuration as a minus planetary gear set, the planetary gears PL3 of the third planetary gear set RS3 are rotatably mounted on the planetary gear carrier ST3, whereby each of these planetary gears PL3 meshes with the sun gear SO3 and with the ring gear HO3. In the same way, the planetary gears PL4 of the fourth planetary gear set RS4 are rotatably mounted on the planetary gear carrier ST4, whereby each of these planetary gears PL4 meshes with the sun gear SO4 and with the ring gear HO4. As is the case for the Simpson planetary gear set, the sun gear SO3 of the third planetary gear set RS3 is permanently connected with the sun gear SO4 of the fourth planetary gear set RS4. In contrast to the Simpson planetary gear set, the planetary gear carrier ST3 of the third planetary gear set RS3 is not permanently connected to the ring gear HO4 of the fourth planetary gear set RS4, but is instead connectable via the third shift element 28 of the transmission GE, which is a clutch. In doing so, the planetary gear carrier ST3 of the third planetary gear set RS3 forms the second rotatable shaft 2, and thus the output AB of the transmission GE, while the ring gear HO4 of the fourth planetary gear set RS4 forms the eighth rotatable shaft 8 of the transmission GE. The two sun gears SO3, SO4 of the third and fourth planetary gear set RS3, RS4, which are permanently connected to one another, form the seventh rotatable shaft 7 of the transmission GE. The ring gear HO3 of the third planetary gear set RS3 forms the fourth rotatable shaft 4 of the transmission GE.

The first shift element 03 of the transmission GE is a brake disposed in the power flow between the third rotatable shaft 3 of the transmission GE and the transmission housing GG, so that the sun gear SO1 of the first planetary gear set RS1 is fixable on the transmission housing GG by engaging said first shift element 03.

The second shift element 04 of the transmission GE is a brake disposed in the power flow between the fourth rotatable shaft 4 of the transmission GE and the transmission housing GG, so that the ring gear HO3 of the third planetary gear set RS3 is fixable on the transmission housing GG by engaging said second shift element 04.

The third shift element 28 of the transmission GE is a clutch disposed in the power flow between the eighth rotatable shaft 8 and the second rotatable shaft 2 of the transmission GE, so that the ring gear HO4 of the fourth planetary gear set RS4 is connectable to the planetary gear carrier ST3 of the third planetary gear set RS3, and thus to the output AB of the transmission GE, by engaging said third shift element 28.

The fourth shift element 46 of the transmission GE is a clutch disposed in the power flow between the sixth rotatable shaft 6 and the fourth rotatable shaft 4 of the transmission GE, so that the common ring gear HO1/HO2 of the first and second planetary gear set RS1, RS2 are connectable to the ring gear HO3 of the third planetary gear set RS3 by engaging said fourth shift element 46.

The fifth shift element 57 of the transmission GE is a clutch disposed in the power flow between the seventh rotatable shaft 7 and the fifth rotatable shaft 5 of the transmission GE, so that the sun gears SO3, SO4 of the third and the fourth planetary gear set RS3, RS4, which are permanently connected to one another, are connectable to the sun gear SO2 of the second planetary gear set RS2 by engaging said fifth shift element 57.

The sixth shift element 67 of the transmission GE is a clutch disposed in the power flow between the seventh rotatable shaft 7 and the sixth rotatable shaft 6 of the transmission GE, so that the sun gears SO3, SO4 of the third and the fourth planetary gear set RS3, RS4, which are permanently connected to one another, are connectable to the common ring gear HO1/HO2 of the first and second planetary gear set RS1, RS2 by engaging said sixth shift element 67.

The seventh shift element 47 of the transmission GE is a clutch disposed in the power flow between the seventh rotatable shaft 7 and the fourth rotatable shaft 4 of the transmission GE, so that the sun gears SO3, SO4 of the third and the fourth planetary gear set RS3, RS4, which are permanently connected to one another, are connectable to the ring gear HO3 of the third planetary gear set RS3 by engaging said seventh shift element 47. If the seventh shift element 47 is engaged, the third planetary gear set RS3 is interlocked, a state in which the sun gear SO1, the planetary gear carrier ST3 and the ring gear HO3 of the third planetary gear set RS3 rotate at the same speed.

With respect to the spatial arrangement of the seven shift elements, FIG. 2A provides by way of example that the first shift element 03, which is a multi-disc brake, is substantially disposed on the side of the first planetary gear set RS1 facing the drive, i.e. on the side of the first planetary gear set RS1 facing away from the second planetary gear set RS2. The external disc carrier of the brake 03 can be integrated into the transmission housing GG in a known manner. As a result of the arrangement of the brake 03 on a large diameter, the brake 03, particularly its disc pack, can, also viewed in axial direction, at least be partially disposed in an area radially above the upstream gear set, particularly radially above the first planetary gear set RS1.

The design example depicted in FIG. 2A further provides that the second shift element 04, which is a multi-disc brake, the fourth shift element 46, which is a multi-disc clutch, the fifth shift element 57, which is a multi-disc clutch, and the sixth shift element 67, which is a multi-disc clutch, together form an assembly, which in spatial terms is disposed in an area axially between the second and the third planetary gear set RS2, RS3. In doing so, the clutches 57 and 67 form a dual clutch axially adjoining the second planetary gear set with disc packs arranged radially above one another and a common disc carrier, whereby the disc pack of clutch 67 forms the radially outer disc pack and the disc pack of clutch 57 forms the radially inner disc pack of said dual clutch 57/67, so that this common disc carrier is the inner disc carrier for the clutch 67 and as the external disc carrier for the clutch 57. Again viewed in axial direction, the brake 04 and the clutch 46 are arranged radially above one another, whereby, viewed in axial direction, the disc pack of clutch 46 is disposed radially below the disc pack of brake 04. The brake 04 and the clutch 46 are disposed on the side of the dual clutch 57/67 that faces the third planetary gear set RS3. In accordance with the kinematics of the transmission GE, a common disc carrier, which is the inner disc carrier for the brake 04 and as the external disc carrier for the clutch 46, is provided for the clutch 46 and the brake 04 as well. The external disc carrier of the brake 04 can be integrated into the transmission housing GG in a known manner. In accordance with the kinematics of the transmission GE, a common disc carrier, which is the inner disc carrier for the clutch 46 and as the external disc carrier for the clutch 67, is provided for the clutches 46 and 67 as well.

Alternatively, the three clutches 57, 67 and 46 can form a clutch assembly, also viewed in axial direction radially above one another, whereby then the clutch 46 is the radially outer shift element, the clutch 67 is the radially middle shift element and the clutch 57 is the radially inner shift element. This clutch assembly 57/67/46 is then preferably disposed axially directly adjacent to the second planetary gear set RS2 on its side facing the third planetary gear set RS3. In this case, the brake 04 can be disposed to the left or the right of said clutch assembly 57/67/46; i.e. in an area axially between the clutch assembly 57/67/46 and the third planetary gear set RS3 or in an area above the second planetary gear set RS2. If the installation space within the transmission housing GG permits, the brake 04 can also be disposed viewed in axial direction above the clutch assembly 57/67/46, i.e. radially above the clutch 46.

The design example depicted in FIG. 2A further provides that the seventh shift element 47, which is provided for interlocking the third planetary gear set RS3 and is a multi-disc clutch, is disposed axially adjacent to the third planetary gear set RS3 on the side of the third planetary gear set RS3 that faces away from the fourth planetary gear set RS4, i.e. in spatial terms likewise in an area axially between the second and the third planetary gear set RS2, RS3. The external disc carrier of the clutch 47 and the ring gear HO3 of the third planetary gear set RS can be a common component.

The design example depicted in FIG. 2A further provides that the third shift element 28, which is a multi-disc clutch, viewed in axial direction is at least, with its disc pack, disposed predominantly radially above the fourth planetary gear set RS4, which in terms of production engineering and in a cost-effective manner allows the inner disc carrier of the clutch 28 and the ring gear HO4 of the fourth planetary gear set RS4 to be a common component, for example in one piece.

Figures 2B, 2C:
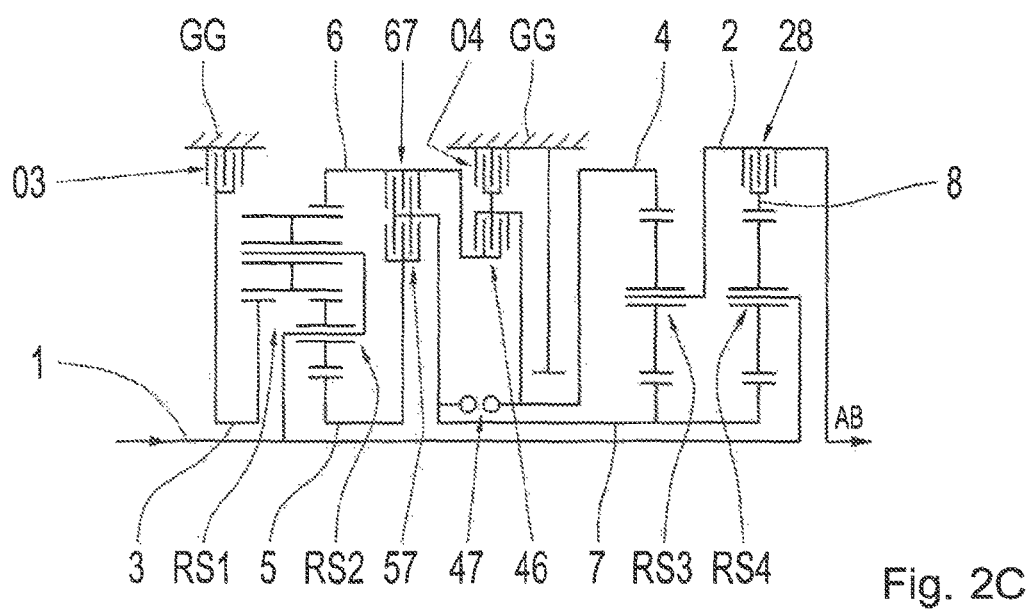
FIG. 2B shows an engagement sequence diagram for the automatic transmission according to FIG. 2A.
FIG. 2C shows a schematic illustration of an exemplary variant of the automatic transmission according to FIG. 2A.

With the total of seven shift elements 03, 04, 28, 46, 57, 67, 47, a selective shifting of eleven forward gears and one reverse gear can be realized, which will be explained in more detail in the following with the aid of FIG. 2B. FIG. 2B shows an example of an engagement sequence diagram for the automatic transmission depicted in FIG. 2A. As indicated with X in the columns of FIG. 2B, which are allocated to the individual shift elements 03, 04, 28, 46, 47, 57, 67, three of the seven shift elements are engaged in each gear. In the first forward gear the shift elements 04, 57 and 67 are torque transmitting or engaged; in the second forward gear the shift elements 03, 04 and 67 are torque transmitting or engaged, in the third forward gear the shift elements 03, 04 and 57 are torque transmitting or engaged, in the fourth forward gear the shift elements 03, 04 and 28 are torque transmitting or engaged, in the fifth forward gear the shift elements 03, 28 and 57 are torque transmitting or engaged, in the sixth forward gear the shift elements 03, 28 and 67 are torque transmitting or engaged, in the seventh forward gear the shift elements 28, 46 and 67 are torque transmitting or engaged, in the eighth forward gear the shift elements 03, 28 and 46 are torque transmitting or engaged, in the ninth forward gear the shift elements 03, 46 and 67 are torque transmitting or engaged, in the tenth forward gear the shift elements 03, 46 and 57 are torque transmitting or engaged, in the eleventh forward gear the shift elements 03, 47 and 57 are torque transmitting or engaged, in the reverse gear the shift elements 04, 46 and 57 are torque transmitting or engaged.

In accordance with this shift logic, grouped shifting is avoided in a sequential shifting mode, i.e. up or downshifting by one gear respectively, because two adjacent gear steps in the shift logic always share the use of two shift elements. Overall, these eleven forward gears and the reverse gear are shiftable with gear ratios that are useful in practice. As a result of the minimization of the drag losses that unavoidably occur on disengaged frictional shift elements, the fact that three shift elements are engaged in each gear has a positive effect on the efficiency of the transmission.

In principle the spatial arrangement of the seven shift elements 03, 04, 28, 46, 57, 67, 47 of the transmission GE within the transmission housing GG is widely variable and is limited only by the dimensions and the external shape of the transmission housing GG. Correspondingly, the component arrangement shown in FIG. 2A is expressly to be understood as only one of numerous possible component arrangement options. In the same way, the shift elements shown in FIG. 2A being multi-disc clutches or multi-disc brakes is expressly to be understood as only being an example. In other embodiments dog or cone clutches, which are shiftable in a positive-locking manner, band brakes, which are shiftable in a friction-locking manner, or even dog or cone brakes, which are shiftable in a positive-locking manner, for example, are usable as well. As an example of this, FIG. 2C shows a variant of the transmission GE depicted in FIG. 2A, in which, in contrast to FIG. 2A, the seventh shift element 47 is a positive-locking clutch. This structural design uses the advantage provided by the kinematics of the transmission GE that the seventh shift element 47 is only engaged for the gear change from the tenth to the eleventh forward gear and is disengaged for the gear change from the eleventh to the tenth forward gear; i.e. only a small differential speed has to be synchronized in the gear change operation. Due to the shift logic of the transmission GE, the second shift element 04 is well suited for being a positive-locking shift element as well.

Figure 3A:
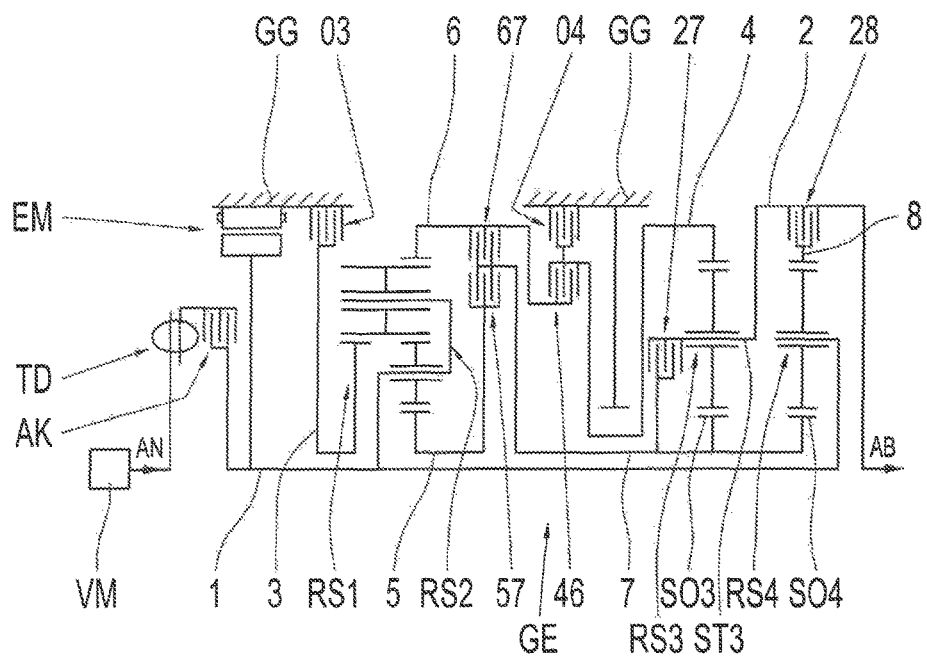
FIG. 3A shows a schematic illustration of a second design example of an automatic transmission according to the invention.

FIG. 3A shows the transmission diagram of a second design example of an automatic transmission according to the invention in an exemplary drive train, in particular of a motor vehicle. This second design example differs from the first design example of an automatic transmission according to the invention, described in detail with the aid of FIG. 2a, only in the manner in which the situative interlocking of the third planetary gear set RS3 is realized. In contrast to FIG. 2A, a seventh shift element, labeled with 27 and disposed in the power flow between the seventh rotatable shaft 7 and the second rotatable shaft 2, is now provided for interlocking the third planetary gear set RS3. In the engaged state this seventh shift element 27, a clutch, thus now connects the sun gear SO3 and the planetary gear carrier ST3 of the third planetary gear set RS3 to one another.

In FIG. 3A, said seventh shift element 27 is disposed in spatial terms in an area axially between the second and the third planetary gear set RS2, RS3, for example; axially adjacent to the third planetary gear set RS3 on the side of the third planetary gear set RS3 facing away from the fourth planetary gear set RS4. Alternatively to this, as a result of its coupling to the planetary gear carrier ST3 of the third planetary gear set RS3, the seventh shift element 27 can also be disposed in an area axially between the third and the fourth planetary gear set.

Figures 3B, 3C:
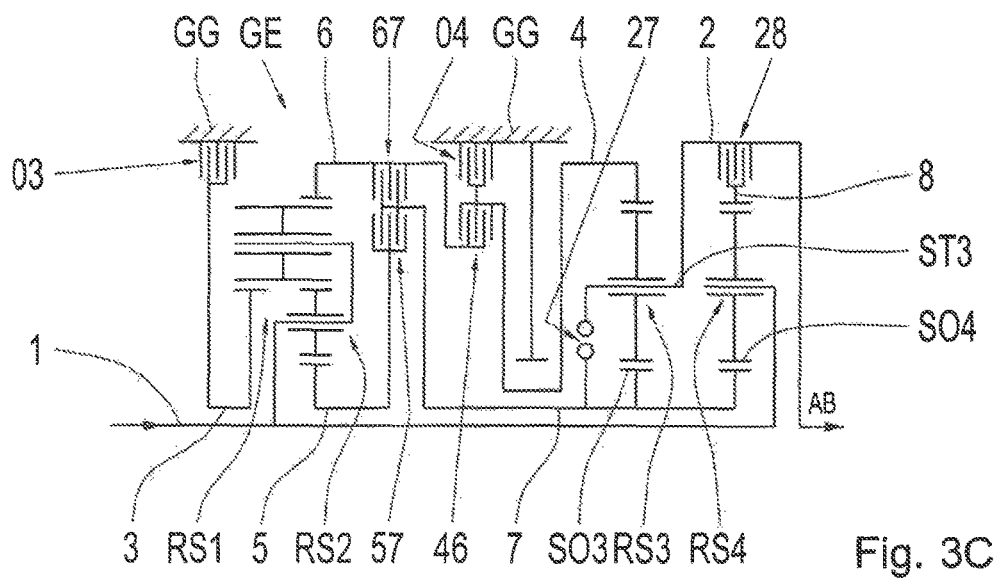
FIG. 3B shows an engagement sequence diagram for the automatic transmission according to FIG. 3A.
FIG. 3C shows a schematic illustration of an exemplary variant of the automatic transmission according to FIG. 3A.

With the total of seven shift elements 03, 04, 28, 46, 57, 67, 27, and as verified by the shift logic shown in FIG. 3B, the shifting of eleven forward gears without grouped shifting and also the realization of a reverse gear remains possible. In principle the engagement sequence diagram shown in FIG. 3B differs from the engagement sequence diagram shown in FIG. 2B only in the modified reference numeral for the seventh shift element. Consequently, unchanged, in the first forward gear the shift elements 04, 57 and 67 are torque transmitting or engaged; in the second forward gear the shift elements 03, 04 and 67 are torque transmitting or engaged, in the third forward gear the shift elements 03, 04 and 57 are torque transmitting or engaged, in the fourth forward gear the shift elements 03, 04 and 28 are torque transmitting or engaged, in the fifth forward gear the shift elements 03, 28 and 57 are torque transmitting or engaged, in the sixth forward gear the shift elements 03, 28 and 67 are torque transmitting or engaged, in the seventh forward gear the shift elements 28, 46 and 67 are torque transmitting or engaged, in the eighth forward gear the shift elements 03, 28 and 46 are torque transmitting or engaged, in the ninth forward gear the shift elements 03, 46 and 67 are torque transmitting or engaged, in the tenth forward gear the shift elements 03, 46 and 57 are torque transmitting or engaged, in the reverse gear the shift elements 04, 46 and 57 are torque transmitting or engaged. Therefore, in the eleventh forward gear, in which the seventh shift element participates in gear generation, the shift elements 03, 27 and 57 are torque transmitting.

In principle the spatial arrangement of the four planetary gear sets RS1, RS2, RS3, RS4 and the seven shift elements 03, 04, 28, 46, 57, 67, 27 of the transmission GE within the transmission housing GG is widely variable and is limited only by the dimensions and the external shape of the transmission housing GG. Correspondingly, the component arrangement shown in FIG. 3A is expressly to be understood as only one of numerous possible component arrangement options. In the same way, the design of the shift elements shown in FIG. 3A as multi-disc clutches or multi-disc brakes is expressly to be understood as only being an example. In other embodiments dog or cone clutches, which are shiftable in a positive-locking manner, band brakes, which are shiftable in a friction-locking manner, or even dog or cone brakes, which are shiftable in a positive-locking manner, are usable as well for example. As an example of this, FIG. 3C shows a variant of the transmission GE depicted in FIG. 3A, in which, in contrast to FIG. 3A, the seventh shift element 27 is a positive-locking clutch. This structural design uses the advantage provided by the kinematics of the transmission GE that the seventh shift element 27 is only engaged for the gear change from the tenth to the eleventh forward gear and is disengaged for the gear change from the eleventh to the tenth forward gear; i.e. only a small differential speed has to be synchronized in the gear change operation.

Figure 4A:
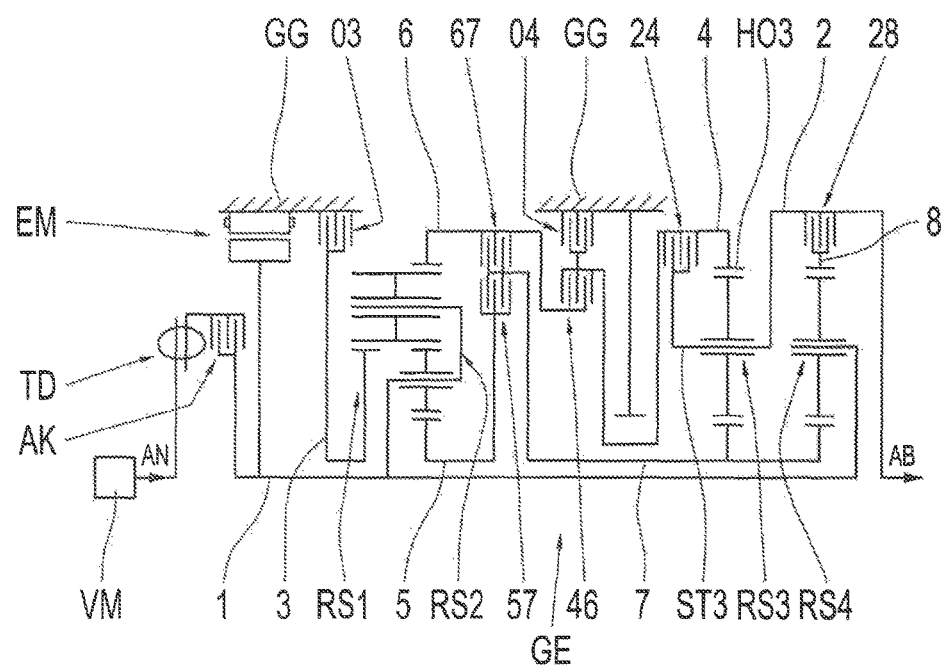
FIG. 4A shows a schematic illustration of a third design example of an automatic transmission according to the invention.

FIG. 4A shows the transmission diagram of a third design example of an automatic transmission according to the invention in an exemplary drive train, in particular of a motor vehicle. This third design example differs from the first design example shown in FIG. 2A and from the second design example shown in FIG. 3A of an automatic transmission according to the invention again only in the manner in which the situative interlocking of the third planetary gear set RS3 is realized. In contrast to FIG. 2A and to FIG. 3A, a seventh shift element, labeled with 24 and disposed in the power flow between the fourth rotatable shaft 4 and the second rotatable shaft 2, is now provided for interlocking the third planetary gear set RS3. In the engaged state this seventh shift element 24, a clutch, thus now connects the ring gear HO3 and the planetary gear carrier ST3 of the third planetary gear set RS3 to one another.

In FIG. 4A, said seventh shift element 24 is disposed in spatial terms in an area axially between the second and the third planetary gear set RS2, RS3, for example; axially adjacent to the third planetary gear set RS3 on the side of the third planetary gear set RS3 facing away from the fourth planetary gear set RS4.

Figures 4B, 4C:
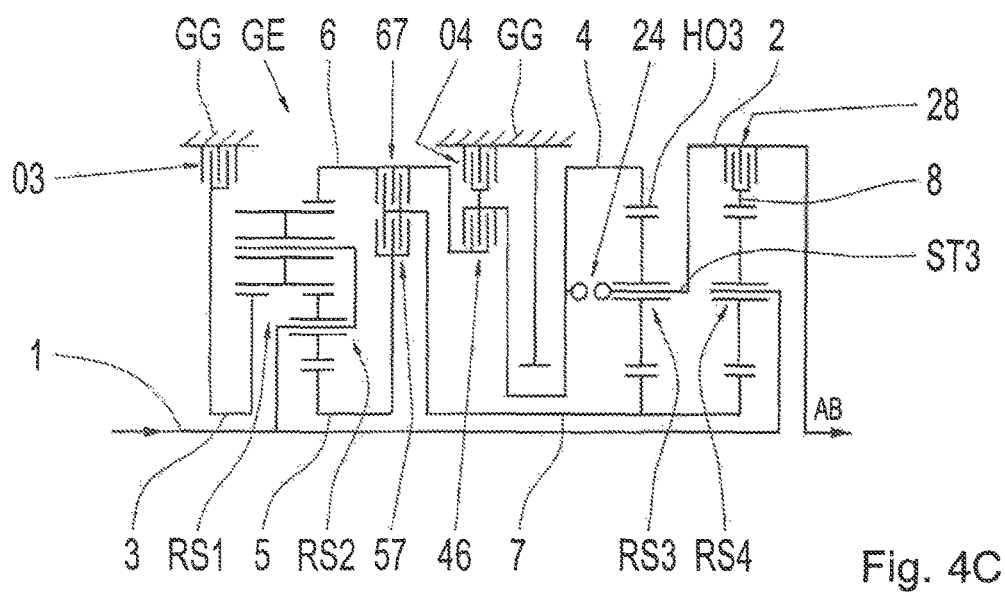
FIG. 4B shows an engagement sequence diagram for the automatic transmission according to FIG. 4A.
FIG. 4C shows a schematic illustration of an exemplary variant of the automatic transmission according to FIG. 4A.

With the total of seven shift elements 03, 04, 28, 46, 57, 67, 24, and as verified by the shift logic shown in FIG. 4B, the shifting of eleven forward gears without grouped shifting and also the realization of a reverse gear remains possible. In principle the engagement sequence diagram shown in FIG. 4B differs from the engagement sequence diagram shown in FIG. 1B and in FIG. 2B only in the modified reference numeral for the seventh shift element. Consequently, unchanged, in the first forward gear the shift elements 04, 57 and 67 are torque transmitting or engaged; in the second forward gear the shift elements 03, 04 and 67 are torque transmitting or engaged, in the third forward gear the shift elements 03, 04 and 57 are torque transmitting or engaged, in the fourth forward gear the shift elements 03, 04 and 28 are torque transmitting or engaged, in the fifth forward gear the shift elements 03, 28 and 57 are torque transmitting or engaged, in the sixth forward gear the shift elements 03, 28 and 67 are torque transmitting or engaged, in the seventh forward gear the shift elements 28, 46 and 67 are torque transmitting or engaged, in the eighth forward gear the shift elements 03, 28 and 46 are torque transmitting or engaged, in the ninth forward gear the shift elements 03, 46 and 67 are torque transmitting or engaged, in the tenth forward gear the shift elements 03, 46 and 57 are torque transmitting or engaged, in the reverse gear the shift elements 04, 46 and 57 are torque transmitting or engaged. Therefore, in the eleventh forward gear, in which the seventh shift element participates in gear generation, the shift elements 03, 24 and 57 are torque transmitting.

In principle the spatial arrangement of the four planetary gear sets RS1, RS2, RS3, RS4 and the seven shift elements 03, 04, 28, 46, 57, 67, 24 of the transmission GE within the transmission housing GG is widely variable and is limited only by the dimensions and the external shape of the transmission housing GG. Correspondingly, the component arrangement shown in FIG. 4A is expressly to be understood as only one of numerous possible component arrangement options. In the same way, the design of the shift elements shown in FIG. 4A as multi-disc clutches or multi-disc brakes is expressly to be understood as only being an example. In other embodiments dog or cone clutches, which are shiftable in a positive-locking manner, band brakes, which are shiftable in a friction-locking manner, or even dog or cone brakes, which are shiftable in a positive-locking manner, are usable as well for example. As an example of this, FIG. 4C shows a variant of the transmission GE depicted in FIG. 4A, in which, in contrast to FIG. 4A, the seventh shift element 24 is a positive-locking clutch. This structural design uses the advantage provided by the kinematics of the transmission GE that the seventh shift element 24 is only engaged for the gear change from the tenth to the eleventh forward gear and is disengaged for the gear change from the eleventh to the tenth forward gear; i.e. only a small differential speed has to be synchronized in the gear change operation.

REFERENCE NUMERALS

AB output shaft
AN input shaft
AK launching clutch
EM electric motor
EMR rotor of the electric motor
EMS stator of the electric motor
TD torsion damper
VM internal combustion engine
GE transmission; automatic transmission
GG transmission housing
RS1 first planetary gear set of the transmission
HO1 ring gear of the first planetary gear set
PL1 planetary gears of the first planetary gear set
SO1 sun gear of the first planetary gear set
ST1 planetary gear carrier of the first planetary gear set
RS2 second planetary gear set of the transmission
HO2 ring gear of the second planetary gear set
PL2a outer planetary gears of the second planetary gear set
PL2i inner planetary gears of the second planetary gear set
SO2 sun gear of the second planetary gear set
ST2 planetary gear carrier of the second planetary gear set
RS3 third planetary gear set of the transmission
HO3 ring gear of the third planetary gear set
SO3 sun gear of the third planetary gear set
ST3 planetary gear carrier of the third planetary gear set
RS4 fourth planetary gear set of the transmission
SO4 sun gear of the fourth planetary gear set
ST4 planetary gear carrier of the fourth planetary gear set
HO4 ring gear of the fourth planetary gear set
1 first rotatable shaft of the transmission; transmission input shaft
2 second rotatable shaft of the transmission; transmission output shaft
3 third rotatable shaft of the transmission
4 fourth rotatable shaft of the transmission
5 fifth rotatable shaft of the transmission
6 sixth rotatable shaft of the transmission
7 seventh rotatable shaft of the transmission
8 eighth rotatable shaft of the transmission
03 first shift element of the transmission; first brake
04 second shift element of the transmission; second brake
28 third shift element of the transmission; first clutch
46 fourth shift element of the transmission; second clutch
57 fifth shift element of the transmission; third clutch
67 sixth shift element of the transmission; fourth clutch
47, 27, 24 seventh shift element of the transmission; fifth clutch

The invention claimed is:

1. An automatic transmission (GE) for a motor vehicle, comprising:
   a transmission housing (GG);
   a drivable first rotatable shaft (1);
   a second rotatable shaft (2) as the output of the automatic transmission (GE);
   a plurality of planetary gear sets including a first planetary gear set (RS1), a second planetary gear set (RS2), a third planetary gear set (RS3) and a fourth planetary gear set (RS4); and
   a plurality of shift elements including a first shift element (03), a second shift element (04), a third shift element (28), a fourth shift element (46), a fifth shift element (57) and a sixth shift element (67) for shifting into different gear ratios between the first shaft (1) and the second shaft (2);
   wherein
      each of the first, third and fourth planetary gear sets (RS1, RS3, RS4) is a negative planetary gear set and the second planetary gear set (RS2) is a positive planetary gear set;

a planetary gear carrier (ST1) of the first planetary gear set (RS1), a planetary gear carrier (ST2) of the second planetary gear set (RS2), and a planetary gear carrier (ST4) of the fourth planetary gear set (RS4) are permanently connected to one another and form the first rotatable shaft (1) of the automatic transmission (GE);

a planetary gear carrier (ST3) of the third planetary gear set (RS3) forms the second rotatable shaft (2) of the automatic transmission (GE);

a sun gear (SO1) of the first planetary gear set (RS1) forms a third rotatable shaft (3) of the automatic transmission (GE);

a ring gear (HO3) of the third planetary gear set (RS3) forms a fourth rotatable shaft (4) of the automatic transmission (GE);

a sun gear (SO2) of the second planetary gear set (RS2) forms a fifth rotatable shaft (5) of the automatic transmission (GE);

a ring gear (HO1) of the first planetary gear set (RS1) and a ring gear (HO2) of the second planetary gear set (RS2) are permanently connected to one another or configured as a common component and form a sixth rotatable shaft (6) of the automatic transmission (GE);

a sun gear (SO3) of the third planetary gear set (RS3) and a sun gear (SO4) of the fourth planetary gear set (RS4) are permanently connected to one another and form a seventh rotatable shaft (7) of the automatic transmission (GE);

a ring gear (HO4) of the fourth planetary gear set (RS4) forms an eighth rotatable shaft (8) of the automatic transmission (GE); and wherein the first shift element (03) is disposed in the power flow between the third rotatable shaft (3) and the transmission housing (GG);

the second shift element (04) is disposed in the power flow between the fourth rotatable shaft (4) and the transmission housing (GG);

the third shift element (28) is disposed in the power flow between the second and the eighth rotatable shafts (2, 8);

the fourth shift element (46) is disposed in the power flow between the fourth and the sixth rotatable shafts (4, 6);

the fifth shift element (57) is disposed in the power flow between the fifth and the seventh rotatable shafts (5, 7);

the sixth shift element (67) is disposed in the power flow between the sixth and the seventh rotatable shafts (6, 7); and a seventh shift element (47, 27, 24) is disposed in the power flow between the fourth and seventh rotatable shafts (4, 7) or between the second and seventh rotatable shafts (2, 7) or between the second and the fourth rotatable shafts (2, 4).

2. The automatic transmission according to claim 1, wherein three of the plurality of shift elements are engaged in each gear of the automatic transmission (GE) with only one of the previously engaged shift elements being disengaged and only one of the previously disengaged shift elements being engaged when shifting from one gear into the next higher or lower gear of the automatic transmission (GE).

3. The automatic transmission according to claim 2, wherein eleven forward gears and one reverse gear are shiftable;

in the first forward gear, the second, fifth and sixth shift element (04, 57, 67) are torque transmitting;

in the second forward gear, the first, second and sixth shift element (03, 04, 67) are torque transmitting;

in the third forward gear, the first, second, and fifth shift element (03, 04, 57) are torque transmitting;

in the fourth forward gear, the first, second, and third shift element (03, 04, 28) are torque transmitting;

in the fifth forward gear, the first, third, and fifth shift element (03, 28, 57) are torque transmitting;

in the sixth forward gear, the first, third, and sixth shift element (03, 28, 67) are torque transmitting;

in the seventh forward gear, the third, fourth and sixth shift element (28, 46, 67) are torque transmitting;

in the eighth forward gear, the first, third and fourth shift element (03, 28, 46) are torque transmitting;

in the ninth forward gear, the first, fourth and sixth shift element (03, 46, 67) are torque transmitting;

in the tenth forward gear, the first, fourth and fifth shift element (03, 46, 57) are torque transmitting;

in the eleventh forward gear, the first, fifth and seventh shift element (03, 57, 47; 03, 57, 27; 03, 57, 24) are torque transmitting; and in the reverse gear, the second, fourth and fifth shift element (04, 46, 57) are torque transmitting.

4. The automatic transmission according to claim 1, wherein the planetary gear sets are disposed coaxially to one another and in an axial direction behind one another in the sequence: the first planetary gear set (RS1); the second planetary gear set (RS2); the third planetary gear set (RS3); and the fourth planetary gear set (RS4).

5. The automatic transmission according to claim 4, wherein the seventh shift element (47; 27; 24) is disposed between the second and the third planetary gear sets (RS2, RS3) along the axial direction.

6. The automatic transmission according to claim 4, wherein the seventh shift element (27) is disposed between the third and the fourth planetary gear sets (RS3, RS4) along the axial direction.

7. The automatic transmission according to claim 4, wherein the seventh shift element (47; 27; 24) is disposed adjacent the third planetary gear set (RS3).

8. The automatic transmission according to claim 1, wherein the fourth, fifth and sixth shift elements (46, 57, 67) form a clutch assembly, the clutch assembly positioned adjacent the second planetary gear set (RS2), the clutch assembly comprising:

a first disc carrier that is an external disc carrier for the fifth shift element (57) and an inner disc carrier for the sixth shift element (67);

a second disc carrier that is an external disc carrier for the sixth shift element (67) and an inner disc carrier for the fourth shift element;

a disc pack with the inner and outer clutch discs of the fifth shift element (57);

an actuation device of the fifth shift element (57) that actuates the disc pack of the fifth shift element (57);

a disc pack with the inner and outer clutch discs of the sixth shift element (67);

an actuation device of the sixth shift element (67) that actuates the disc pack of the sixth shift element (67);

a disc pack with the inner and outer clutch discs of the fourth shift element (46); and an actuation device of the fourth shift element (46) that actuates the disc pack of the fourth shift element (46);

wherein, along an axial direction, the disc pack of the fourth shift element (46) is disposed substantially radially above the disc pack of the sixth shift element (67) and the disc pack of the sixth shift element (67) is disposed substantially radially above the disc pack of the fifth shift element (57).

9. The automatic transmission according to claim 1, further comprising an electric motor (EM), the first rotatable shaft (1) being permanently connected to a rotor (EMR) of the electric motor (EM).

10. The automatic transmission according to claim 1, further comprising an electric motor (EM), the second rotatable shaft (2) being permanently connected to a rotor (EMR) of the electric motor (EM).

11. The automatic transmission according to claim 1, further comprising an electric motor (EM), the fourth rotatable shaft (4) being permanently connected to a rotor (EMR) of the electric motor (EM).

12. The automatic transmission according to claim 1, further comprising an electric motor (EM), the sixth rotatable shaft (6) being permanently connected to a rotor (EMR) of the electric motor (EM).

* * * * *